UNITED STATES PATENT OFFICE.

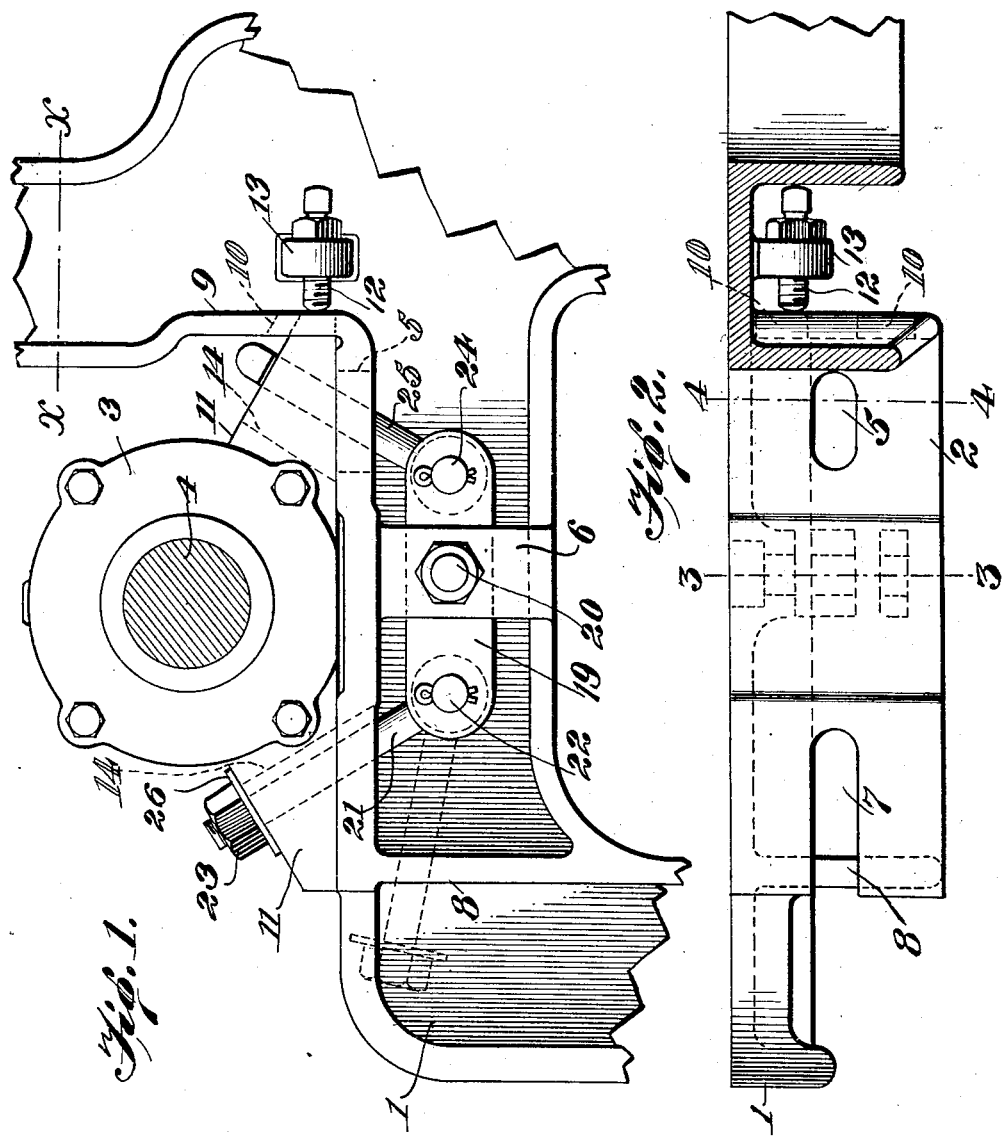

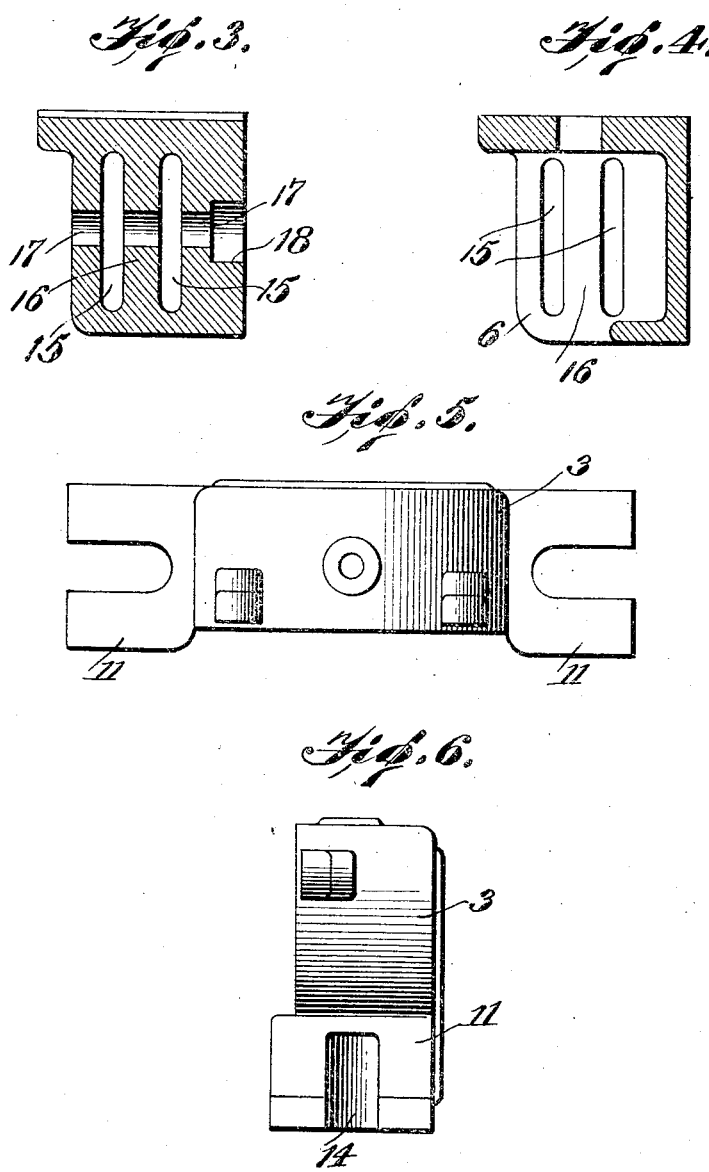

ARTHUR W. MERKEL, OF BIRMINGHAM, ALABAMA, ASSIGNOR TO CONTINENTAL GIN COMPANY, A CORPORATION.

QUICK-DEMOUNTABLE BEARING FOR LINTER-GIN-SAW SHAFTS.

1,230,591.  Specification of Letters Patent.  Patented June 19, 1917.

Application filed February 24, 1917. Serial No. 150,809.

*To all whom it may concern:*

Be it known that I, ARTHUR W. MERKEL, a citizen of the United States of America, residing at Birmingham, in the county of Jefferson and State of Alabama, have invented certain new and useful Improvements in Quick-Demountable Bearings for Linter-Gin-Saw Shafts, of which the following is a specification.

This invention relates to improvements in quick demountable bearings for shafts and especially for the saw shafts of linter gins. Inasmuch as such saw shafts must be frequently removed, due to the dulling of the saws, the practice has arisen of dismounting the bearings with the shaft so that each shaft carries its bearings which are interchangeable on the gin frames. Under such conditions it is of obvious advantage to so design the bearings that they can be quickly dismounted and replaced, and that the bearings of different shafts will automatically assume the proper adjustment required for each gin when clamped to its frame. In linter gins the frame stands so close to the rear or inner ends of the bearing housings that it is difficult and inconvenient to manipulate the bolts or screws heretofore used to secure the housing to the frame. Moreover, where separate fastenings are provided for each end of the housing, it is obvious that two operations are required both to dismount and to remount the housing and that the application of these fastenings must be such as to make certain that the housing is not drawn away from its proper adjustment.

The purpose of my invention is to design a hold-down or fastening for bearing housings which will take simultaneous effect on each end thereof so that it can be mounted or dismounted by a single operation. To this end, both hold-down members are connected to a rocking element below the bearing seat of the frame and arranged so that the tightening of one member automatically applies both. In order that the application of power to the two hold-down members shall be such as to insure the housing being held against the adjustment stop, the parts are designed to exert a greater leverage on the side of the housing away from the stop so that the tendency as the fastenings are clamped is to shift and hold the housing positively against the stop. Obviously, a nut or any equivalent means may be used to apply or release the hold-downs and it will be disposed at the front end of the housing where most convenient for access.

My invention comprises other novel features of construction and arrangements of parts, which in their preferred embodiment only are illustrated in the accompanying drawings, in which:—

Figure 1 shows in end elevation a linter gin saw shaft bearing with the gin frame shown in part.

Fig. 2 is a plan view of the housing seat on the frame, the housing being removed and the frame shown in section on the line $x$—$x$ of Fig. 1.

Figs. 3 and 4 are sectional views taken on the lines 3—3 and 4—4 of Fig. 2.

Fig. 5 is a plan view of the bearing; and

Fig. 6 is an end view thereof.

Similar reference numerals refer to similar parts throughout the drawings.

In the embodiment of my invention illustrated, I show a linter gin frame 1 having a lateral top extension forming a seat 2 for the housing 3 that carries the ball or roller bearings (not shown) which are mounted on the linter gin saw shaft 4. A slot 5 is formed in the seat at one side and disposed to the right of a vertical bearing web 6 under the seat. This web, as seen in Fig. 1, is set slightly to the right of the normal bearing center line. The seat 2 is provided with a slot 7 to the left of said web, which slot extends beyond the side edge of the seat and down partway through a vertical supporting web 8 thereunder. The right hand end of the seat is joined to a vertical web 9 for supporting the front cap of the gin. Two spaced slots 10 are provided in the lower portion of the web 9, one on each side of and adjacent to slot 5 and extend from the top level of the seat 2 upwardly a sufficient distance to receive the inner or rear wedge shaped end 11 of the housing. Opposite the inside slot 10 I provide a set screw 12 mounted in a lug 13 cast on the frame and adapted to serve as an adjustable limit or stop for the inner end 11 of the housing.

The housing, as seen in Figs. 1 and 5, is provided on each side with similar wedge shaped ends 11, each of which is bifurcated. The inner walls 14, Fig. 1, of these slots slope inwardly and downwardly toward the web 6.

The web 6, as seen in Fig. 4, has two vertical slots 15 which leave between them a central web 16. Alining bolt holes 17 are provided throughout the sections of this web with a countersunk seat 18 at one end to receive the head of bolt 20. A pair of plates 19 are provided, one being disposed in each slot 15 and both being pivotally mounted in the web a little to the right (Fig. 1) of their centers by the bolt 20. These plates, at their left hand ends, receive between them an eye on a special bolt 21, the bolt and plates being pivotally connected together by a pin 22. The free end of the bolt 21 projects up through the slot 7 of the side and through the slot 13 in the left hand end 11 of the housing, having its end threaded to receive a nut 23. Between the right hand ends of the plates 19 I pivotally connect the eye of a special T-head bolt 25 by a pin 24, the bolt having at its upper end a T-head disposed with its greatest length parallel with the pin 24. This head, being longer than the slot 13 is wide, will bear upon the right hand wedge end 11 of the housing with its shank passing through the housing slot 13 and the seat slot 5. A washer 26 is customarily used under the nut 23.

In operation, we will assume the housing mounted on its seat with the bifurcations of its inner wedge end 11 projecting through the slots 10 into engagement with the set screw 12 and with the bolts 21 and 25 in the position shown in Fig. 1. The nut 23, when run down on the bolt 21, will act through the rocking plates 19 to clamp both bolts 21 and 25 against the wedge ends 11 of the housing and clamp it firmly and rigidly to its seat on the frame. By reason of the fact that the bolt 21 is connected farther from the center of the plates 19 than the bolt 25, it will exert a stronger pull on the housing than bolt 25, tending to force the housing rearwardly against the set screw as the clamp mechanism takes effect. When it is desired to dismount the housing, as when changing the gin saw shaft, the nut 23 is run out far enough on bolt 21 to clear the front end 11 of the housing and to drop into the slot in the web 8, as shown in dotted lines, Fig. 1. When this occurs, it will be apparent that the bolt 25 is also released as the plates 19 are then free to rock on their fulcrum bolt 20, so that the housing can be slipped to the front off the seat. To remount the bearing, it is only necessary to return it with a sidewise movement onto its seat, causing its bifurcated end to straddle the T-bolt 25 and project through the slots 10 until it engages the stop 12, when the bolt 21 is swung up to full line position, Fig. 1, and the nut screwed tight against the front wedge end 11, thereby making fast both ends 11 of the housing. If it is desired to adjust the bearing laterally, after adjusting the set screw, it is only necessary to loosen up on the nut and slip the bearing sidewise, as may be desired, and then by tightening up again on the nut 23, both bolts will take hold and secure the housing.

It will at once be apparent that it will be tedious and difficult to get access to the rear hold-down bolt 25 to screw a nut thereon and that I avoid this by controlling the application of clamping pressure to both bolts by the instrumentality of the single nut 23, which is disposed in the most convenient position available.

In order to provide for the adjusting of the housing, it is desirable that the fastening members take effect on wedge surfaces, but it will be readily apparent that the principle involved in my invention can be applied to other housing designs so as to effectively hold them while permitting their quick release. While I prefer to use bolts as the hold-down elements, the shape of the latter is not material and may be varied to suit different conditions.

I have illustrated only one saw shaft bearing, but it will be understood that all the bearings therefor are of similar design. When I refer therein to a bearing housing, I intend thereby to include the bearing element that is removable to permit the dismounting of the shaft.

Having thus described my invention, what I claim as new and desire to secure by Letters Patent, is:—

1. In a quick demountable bearing, a bearing seat, a bearing housing detachably mounted on said seat, hold-down members which engage the ends of the housing, a lever having an intermediate fulcrum and end connections to said hold-down members, and means to move both hold-down members through the instrumentality of the lever in unison to clamp or release the housing.

2. In a quick demountable bearing, a bearing seat, a bearing housing detachably mounted on said seat and having wedge shaped ends, hold-down members which engage the wedge ends of the housing, a lever having an intermediate fulcrum and end connections to said hold-down members, and means to move both hold-down members through the instrumentality of the lever in unison to clamp or release the housing.

3. In a quick demountable bearing, a bearing seat, a bearing housing detachably mounted on said seat, a single hold-down element for each end of the housing, a lever having a hold-down element connected to each end, an intermediate fulcrum for the lever, and means to move both hold-down members through the instrumentality of the lever in unison to clamp or release the housing.

4. The combination with a bearing housing and its seat, of an element pivoted under the seat to rock in a vertical plane, hold-down members for each side of the housing connected to the ends of said rocking element, there being slots in the seat through which said members pass, and an adjustable element on one of said hold-down members and adapted to engage the housing and make both members fast.

5. The combination with a housing and a slotted seat therefor, of a lever fulcrumed between its ends to move in a vertical plane under said seat, and hold-down members for said housing connected to the ends of said lever, one hold-down member having a rigid head engaging one side of the housing and the other member having an adjustable head engaging the other side of the housing, substantially as described.

6. A housing having wedge shaped slotted ends, a seat for the housing, hold-down members adapted to pass through said housing slots, one of which at least has a nut engaging a wedge end of the housing, and a fulcrumed lever connecting the hold-down means to the seat and adapted to cause them to move reversely as the nut is screwed against the housing, substantially as described.

7. A bearing housing having wedge shaped ends with a vertical slot extending through each end thereof, a seat open under said slots, a hold-down member for the housing adapted to pass through each slot therein and to extend below the seat, a fulcrumed lever connected to the lower ends of said hold-down members on opposite sides of its fulcrum point, and a nut on one of the hold-down members adapted to screw against the wedge shaped housing end and make both hold-down members fast, substantially as described.

8. A quick demountable bearing housing for linter gin saw shafts, comprising, in combination, a housing having front and rear extensions with sloping top surfaces, and vertical slots bifurcating the ends of said extensions, a bearing seat slotted beneath the normal positions of said housing slots, a lever fulcrumed intermediate its ends below the seats and adapted to rock in a vertical plane, hold-down bolts pivotally connected to the ends of the lever and adapted to project through said slots substantially at right angles to the inclined top surfaces of said extensions, a rigid head on the rear bolt engaging the rear extension, and a nut on the threaded end of the front bolt, substantially as described.

9. A quick demountable bearing housing comprising, in combination, a housing having its front and rear ends wedge shaped, a housing seat, a lever pivoted to the seat, and hold-down members engaging said wedge portions of the housing and connected to the ends of the lever, the front hold-down member having a nut threaded thereon and adapted to engage the housing, and an adjustable stop which the rear end of the housing engages, substantially as described.

10. A quick demountable bearing housing comprising, in combination, a seat, a housing having in opposite ends thereof wedge members, hold-downs engaging said wedge members, a lever to which said hold-downs are connected, a fulcrum for the lever between the hold-down connections, the front hold-down having a nut threaded thereon and adapted to apply or release both hold-downs simultaneously, and an adjustable stop to hold the bearing in position on its seat, the fulcrum being disposed to give the front hold-down greater leverage than the rear hold-down, as and for the purposes described.

11. In a quick demountable bearing, a bearing housing, hold-down elements adapted to engage the bearing housing, a housing seat having slots through which said elements pass, a lever to which said elements are pivotally connected and adapted to move therewith in reverse directions, the slot at one end of the seat permitting the adjacent hold-down element to swing down thereinto below the seat level, and means to clamp the hold-down elements against the housing.

In testimony whereof I affix my signature.

ARTHUR W. MERKEL.

Witness:
  H. F. Davis.